(12) United States Patent
Kim et al.

(10) Patent No.: US 10,797,838 B2
(45) Date of Patent: Oct. 6, 2020

(54) APPARATUS AND METHOD FOR MANAGING RADIO RESOURCES IN MOBILE COMMUNICATION SYSTEM

(71) Applicant: ELECTRONICS AND TELECOMMUNICATIONS RESEARCH INSTITUTE, Daejeon (KR)

(72) Inventors: Jung Bin Kim, Seoul (KR); Jung Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 16/137,682

(22) Filed: Sep. 21, 2018

(65) Prior Publication Data
US 2019/0103948 A1 Apr. 4, 2019

(30) Foreign Application Priority Data

Sep. 29, 2017 (KR) .......... 10-2017-0128227
Aug. 21, 2018 (KR) .......... 10-2018-0097220

(51) Int. Cl.
*H04L 5/00* (2006.01)
*H04W 72/04* (2009.01)
*H04W 72/08* (2009.01)

(52) U.S. Cl.
CPC .......... *H04L 5/0048* (2013.01); *H04L 5/005* (2013.01); *H04L 5/0053* (2013.01); *H04L 5/0057* (2013.01); *H04W 72/04* (2013.01); *H04W 72/042* (2013.01); *H04W 72/085* (2013.01)

(58) Field of Classification Search
CPC ..... H04L 5/0048; H04L 5/005; H04L 5/0053; H04L 5/0057; H04W 72/04; H04W 72/042; H04W 72/085
See application file for complete search history.

(56) References Cited

U.S. PATENT DOCUMENTS

| 8,804,772 B2 | 8/2014 | Dinan |
| 9,060,321 B2 * | 6/2015 | Ng .................. H04W 56/00 |
| 2012/0039271 A1 | 2/2012 | Kim et al. |

(Continued)

FOREIGN PATENT DOCUMENTS

| KR | 10-2008-0065559 A | 7/2008 |
| KR | 10-2014-0011820 A | 1/2014 |

*Primary Examiner* — Saad A. Waqas
(74) *Attorney, Agent, or Firm* — LRK Patent Law Firm

(57) ABSTRACT

An operation method of a terminal in a mobile communication system includes receiving information indicating a first scheduling region map consisting of a plurality of resource regions from a base station, the information indicating the first scheduling region map including information indicating the plurality of resource regions included in the first scheduling region map; receiving first resource allocation information indicating a first resource region allocated to the terminal among the plurality of resource regions included in the first scheduling region map from the base station; receiving a first reference signal (RS) from the base station through the first resource region; generating first channel state information (CSI) for the first resource region based on the first RS; and transmitting the first CSI to the base station.

10 Claims, 13 Drawing Sheets

(56) References Cited

U.S. PATENT DOCUMENTS

| | | | |
|---|---|---|---|
| 2012/0058791 A1* | 3/2012 | Bhattad | H04L 27/261 |
| | | | 455/509 |
| 2012/0287885 A1 | 11/2012 | Dai | |
| 2014/0023006 A1 | 1/2014 | Jeong et al. | |
| 2014/0204853 A1* | 7/2014 | Ko | H04L 5/0035 |
| | | | 370/329 |
| 2014/0328303 A1* | 11/2014 | Jamadagni | H04L 5/0053 |
| | | | 370/329 |
| 2015/0098421 A1 | 4/2015 | Barbieri et al. | |
| 2016/0007363 A1* | 1/2016 | Hahn | H04W 72/085 |
| | | | 370/252 |
| 2016/0057604 A1* | 2/2016 | Luo | H04W 8/005 |
| | | | 370/330 |
| 2016/0242229 A1* | 8/2016 | Balachandran | H04W 4/70 |
| 2017/0013628 A1* | 1/2017 | Kim | H04W 56/002 |
| 2017/0048884 A1 | 2/2017 | Jung et al. | |
| 2017/0118621 A1* | 4/2017 | Sorrentino | H04W 76/14 |
| 2018/0070363 A1* | 3/2018 | Chakraborty | H04W 72/082 |
| 2019/0069319 A1* | 2/2019 | Arshad | H04W 72/121 |
| 2019/0364449 A1* | 11/2019 | Yang | H04W 24/10 |

\* cited by examiner

FIG. 12

| CHANGE CONFIGURATION NUMBER FIELD | CHANGE PERIOD FIELD | FRAME NUMBER FIELD | | | | | | | | | |
|---|---|---|---|---|---|---|---|---|---|---|---|
| | | 0 | 1 | 2 | 3 | 4 | 5 | 6 | 7 | 8 | 9 |
| 0 | 10 ms | MAP #1 | MAP #2 | MAP #3 | MAP #4 | MAP #5 | MAP #6 | MAP #7 | MAP #8 | MAP #9 | MAP #10 |
| 1 | 20 ms | MAP #1 | MAP #1 | MAP #2 | MAP #2 | MAP #3 | MAP #3 | MAP #4 | MAP #4 | MAP #5 | MAP #5 |
| 2 | 20 ms | MAP #1 | MAP #1 | MAP #3 | MAP #3 | MAP #5 | MAP #5 | MAP #7 | MAP #7 | MAP #9 | MAP #9 |
| 3 | 50 ms | MAP #1 | MAP #1 | MAP #1 | MAP #1 | MAP #1 | MAP #2 | MAP #2 | MAP #2 | MAP #2 | MAP #2 |
| 4 | 50 ms | MAP #3 | MAP #3 | MAP #3 | MAP #3 | MAP #3 | MAP #4 | MAP #4 | MAP #4 | MAP #4 | MAP #4 |
| 5 | 50 ms | MAP #5 | MAP #5 | MAP #5 | MAP #5 | MAP #5 | MAP #6 | MAP #6 | MAP #6 | MAP #6 | MAP #6 |
| 6 | - | MAP #1 | MAP #1 | MAP #1 | MAP #1 | MAP #1 | MAP #1 | MAP #1 | MAP #1 | MAP #1 | MAP #1 |
| 7 | - | MAP #2 | MAP #2 | MAP #2 | MAP #2 | MAP #2 | MAP #2 | MAP #2 | MAP #2 | MAP #2 | MAP #2 |

APPARATUS AND METHOD FOR MANAGING RADIO RESOURCES IN MOBILE COMMUNICATION SYSTEM

CROSS-REFERENCE TO RELATED APPLICATIONS

This application claims priorities to Korean Patent Application No. 10-2017-0128227, filed Sept. 29, 2017, and No. 10-2018-0097220, filed Aug. 21, 2018, in the Korean Intellectual Property Office (KIPO), the entire contents of which are hereby incorporated by reference.

BACKGROUND

1. Technical Field

The present disclosure relates to a mobile communication system, more specifically, to a method and an apparatus for dividing and managing radio resources, and for transmitting and receiving control information indicating the divided radio resources in a wideband mobile communication system.

2. Description of Related Art

In a mobile communication system, radio resources may include frequency-domain resources (referred to simply as 'frequency resources') and time-domain resources (referred to simply as 'time resources'). In the mobile communication system, a base station may use various techniques to increase a data rate for the terminal. For example, the base station may perform scheduling including assignment of a modification coding scheme (MCS) in consideration of a channel state with the terminal in a frequency domain and a time domain of radio resources.

The base station may adaptively change the MCS for the data to transmit according to the channel state with the terminal while maintaining a target reception error rate for the terminal. For example, the base station may select an MCS for a higher data rate for the data when the channel state with the terminal is good. On the other hand, when the channel state with the terminal is not good, the base station may select an MCS for a lower data rate for the data.

The scheduling may refer to an operation in which the base station allocates radio resources based on a channel state of each of a plurality of terminals connected to the base station. For example, the base station may preferentially select a terminal having a good channel state to allocate radio resources. The base station may obtain frequency, time, and diversity effects for multiple users through the scheduling.

The base station may receive channel state information from each of the plurality of terminals to perform scheduling including determination of the MCS for the each of the plurality of terminals. The base station may perform scheduling for each of the plurality of terminals based on the channel state information received from each of the plurality of terminals. Here, the base station may allocate independent frequency and time resources for each of the plurality of terminals through the scheduling.

The base station may transmit scheduling information and MCS information to each of the plurality of terminals via a control channel. Also, the base station may transmit data to which the MCS is applied to each of the plurality of terminals through the resources allocated through the scheduling information. Each of the plurality of terminals may acquire the scheduling information and the MCS information from downlink control information (DCI) received through the control channel. Then, each of the plurality of terminals may receive a signal from the base station through the resources allocated thereto, and decode the data from the signal received from the base station.

Here, in the case that the mobile communication system is a broadband mobile communication system, various problems may occur. First, excessive computation and power consumption may occur to generate the channel state information in the broadband mobile communication system. For example, the base station may receive the channel state information from each of a plurality of terminals to generate the scheduling information and the MCS information. That is, each of the plurality of terminals may transmit the channel state information on a frequency band to be used to the base station. At this time, each of the plurality of terminals is required to transmit channel state information for each of a number of frequency subbands in a wide system band to the base station.

Thus, in the broadband mobile communication system, each of the plurality of terminals may have to perform an excessive operation to transmit the channel state information. That is, excessive overhead may occur for each of the plurality of terminals. Also, in the broadband mobile communication system, each of the plurality of terminals may consume excessive power to estimate the channel state information for each of a number of frequency subbands.

Also, as the complexity of scheduling for radio resources increases in the broadband mobile communication system, a time delay may occur. For example, when performing the scheduling for radio resources, after allocating the radio resources to each of the plurality of terminals, the base station may consider various parameters to allocate radio resources to each of the plurality of terminals to determine a data transmission scheme for each of the plurality of terminals. In this case, the data transmission scheme may include a rank-1 transmission scheme and a rank-2 transmission scheme. Also, the various parameters may include pairs of the terminals, the number of layers, and the like. The base station may estimate a data throughput based on a combination of the various parameters. The base station may determine radio resources and a transmission scheme for each of the plurality of terminals based on the estimated data throughput.

Therefore, the scheduling complexity for the radio resources may increase in proportion to the increase of radio resources available in the broadband mobile communication system. That is, a problem may arise in which a time delay is caused by the increase in complexity for determining radio resources and a transmission scheme to be allocated to each of the plurality of terminals in the broadband mobile communication system.

SUMMARY

Accordingly, embodiments of the present disclosure provide methods for managing frequency resources and time resources for data transmission in a broadband mobile communication system.

In order to achieve the objective of the present disclosure, an operation method of a terminal in a mobile communication system may comprise receiving information indicating a first scheduling region map consisting of a plurality of resource regions from a base station; receiving first resource allocation information indicating a first resource region allocated to the terminal among the plurality of resource regions constituting the first scheduling region map from the base station; receiving a first reference signal (RS) from the base station through the first resource region; generating a first channel state information (CSI) for the first resource region based on the first RS; and transmitting the first CSI to the base station, wherein the information indicating the first scheduling region map includes information indicating the plurality of resource regions constituting the first scheduling region map.

The operation method may further comprise receiving a downlink control information (DCI) including first scheduling information generated based on the first CSI from the base station through a physical downlink control channel (PDCCH); and receiving data from the base station through a physical downlink shared channel (PDSCH) indicated by the first scheduling information among the plurality of resource regions.

The operation method may further comprise receiving information instructing to change the first resource region to a second resource region included in the plurality of resource regions; receiving a second RS from the base station through the second resource region; generating second CSI for the second resource region based on the second RS; and transmitting the second CSI to the base station.

The operation method may further comprise receiving front the base station information instructing to change the first scheduling region map to a second scheduling region map consisting of a plurality of resource regions, the second scheduling region map being different from the first scheduling region map; receiving second resource allocation information indicating a second resource region allocated to the terminal from the plurality of resource regions constituting the second scheduling region map from the base station; receiving a second RS from the base station through the second resource region; generating a second CSI for the second resource region based on the second RS; and transmitting the second CSI to the base station.

The information indicating the first scheduling region map may indicate a number of resource blocks (RBs) constituting each of the plurality of resource regions.

The information indicating the first scheduling region map may indicate a number of symbols and a number of RBs constituting each of the plurality of resource regions.

The information indicating the first scheduling region map may be received through a radio resource control (RRC) message or a physical broadcast channel (PBCH).

In order to achieve the objective of the present disclosure, an operation method of a terminal in a mobile communication system may comprise receiving from a base station information indicating usage patterns for a plurality of scheduling region maps, each of the plurality of scheduling region maps consisting of a plurality of resource regions; receiving from the base station information indicating a first usage pattern among the usage patterns; receiving first resource allocation information indicating a first resource region allocated to the terminal among the plurality of resource regions constituting the plurality of scheduling region maps according to the first usage pattern; receiving a first reference signal (RS) from the base station through the first resource region; generating a first channel state information (CSI) for the first resource region based on the first RS; and transmitting the first CSI to the base station, wherein the information indicating usage patterns indicates a plurality of different usage patterns for the plurality of scheduling region maps, the first usage pattern includes information instructing to use one of the plurality of scheduling region maps according to a preset time interval, and the plurality of resource regions constituting the plurality of scheduling region maps are different resource regions.

The operation method may further comprise receiving a downlink control information (DCI) including scheduling information generated based on the first CSI from the base station through a physical downlink control channel (PDCCH); and receiving data from the base station through a physical downlink shared channel (PDSCH) indicated by the scheduling information among the plurality of resource regions.

The operation method may further comprise receiving from the base station information instructing to change the first usage pattern to a second usage pattern; receiving second resource allocation information indicating a second resource region allocated to the terminal according to the second usage pattern; receiving a second RS from the base station through the second resource region; generating a second CSI for the second resource region based on the second RS; and transmitting the second CSI to the base station.

The first resource allocation information may indicate a number of resource blocks (RBs) constituting each of the plurality of resource regions.

The first resource allocation information may indicate a number of symbols and a number of resource blocks (RBs) constituting each of the plurality of resource regions.

The information indicating the usage patterns may be received through a radio resource control (RRC) message or a physical broadcast channel (PBCH).

In order to achieve the objective of the present disclosure, an operation method of a base station in a mobile communication system may comprise transmitting information indicating a first scheduling region map consisting of a plurality of resource regions; transmitting to a first terminal first resource allocation information indicating a first resource region allocated to the first terminal among the plurality of resource regions constituting the first scheduling region map; transmitting a first reference signal (RS) to the terminal through the first resource region; and receiving from the first terminal a first channel state information (CSI) for the first resource region generated based on the first RS, wherein the information indicating the first scheduling region map includes information indicating the plurality of resource regions constituting the first scheduling region map.

The operation method may further comprise transmitting a downlink control information (DCI) including first scheduling information generated based on the first CSI from the base station through a physical downlink control channel (PDCCH); and transmitting data to the first terminal through a physical downlink shared channel (PDSCH) indicated by the first scheduling information among the plurality of resource regions.

The operation method may further comprise transmitting to the first terminal information instructing to change the first resource region to a second resource region included in the plurality of resource regions; transmitting a second reference signal (RS) to the first terminal through the second resource region; and receiving from the first terminal a second channel state information (CSI) for the second resource region generated based on the second RS.

The operation method may further comprise transmitting to the first terminal information instructing to change the first scheduling region map to a second scheduling region map consisting of a plurality of resource regions, the second scheduling region map being different from the first scheduling region map; transmitting second resource allocation information indicating a second resource region allocated to the terminal from the plurality of resource regions constituting the second scheduling region map to the first terminal; transmitting a second RS to the first terminal through the second resource region; and receiving from the first terminal a second channel state information (CSI) for the second resource region generated based on the second RS.

The information indicating the first scheduling region map may indicate a number of resource blocks (RBs) constituting each of the plurality of resource regions.

The information indicating the first scheduling region map may indicate a number of symbols and a number of RBs constituting each of the plurality of resource regions.

The information indicating the first scheduling region map may be received through a radio resource control (RRC) message or a physical broadcast channel (PBCH).

According to the embodiments of the present disclosure, in the broadband mobile communication system, the base station may independently configure resource regions for each of a plurality of terminal groups each of which comprises a plurality of terminals by segmenting broadband radio resources, thereby reducing complexity and time latency required for scheduling for the resource regions for each of the plurality of terminal groups.

Also, according to the embodiments of the present disclosure, in the broadband mobile communication system, the terminal generates and transmits channel state information for a resource region allocated to the terminal among the broadband radio resources, thereby reducing the amount of operation and power consumption of the terminal.

BRIEF DESCRIPTION OF DRAWINGS

Embodiments of the present disclosure will become more apparent by describing in detail embodiments of the present disclosure with reference to the accompanying drawings, in which:

FIG. 12 is a conceptual diagram illustrating usage pattern information for scheduling region maps in a broadband mobile communication system according to a third embodiment of the present disclosure.

DETAILED DESCRIPTION OF THE INVENTION

Figure 1:
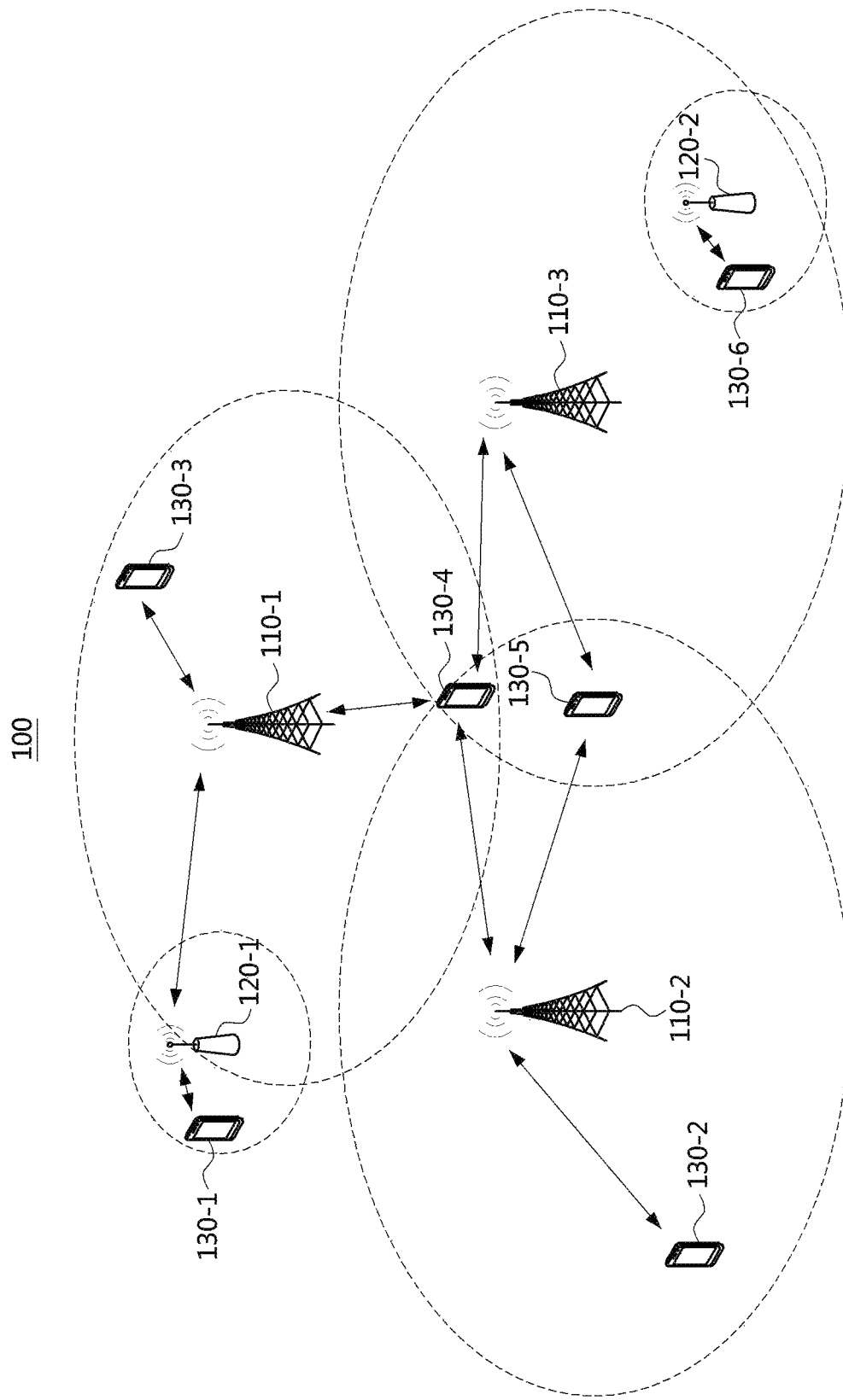
FIG. 1 is a conceptual diagram illustrating a mobile communication system according to a first embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Throughout the specification, a terminal may be a mobile terminal (MT), a mobile station (MS), an advanced mobile station (AMS), a high reliability mobile station (HR-MS), a subscriber station (SS), a portable subscriber station (PSS), an access terminal (AT), an user equipment (UE), or the like. Also, the terminal may include all or a part of functions of MS, AMS, HR-MS, SS, PSS, AT, UE, or the like.

Also, a base station may be an advanced base station (ABS), a high reliability base station (HR-BS), a node B, an evolved node B (eNB), an access point (AP), a radio access station (RAS), a base transceiver station (BTS), a mobile multi-hop relay (MMR)-BS, a relay station (RS), a high reliability relay station (HR-RS) or a small cell base station performing a role of the base station, or the like. Also, the base station may include all or a part of functions of ABS, HR-BS, node B, eNB, AP, RAS, BTS, MMR-BS, RS, HR-RS, small cell base station, or the like.

FIG. 1 is a conceptual diagram illustrating a mobile communication system according to a first embodiment of the present disclosure.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
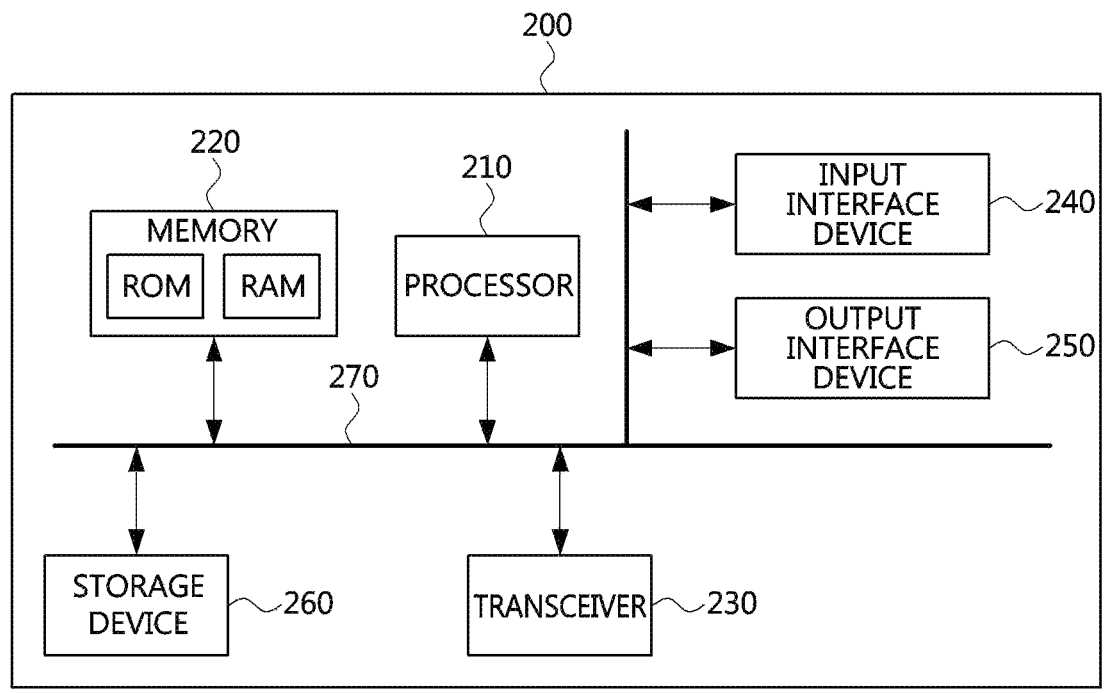
FIG. 2 is a block diagram illustrating a communication node in a mobile communication system according to a first embodiment of the present disclosure.

FIG. 2 is a block diagram illustrating a communication node in a mobile communication system according to a first embodiment of the present disclosure.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Figure 3:
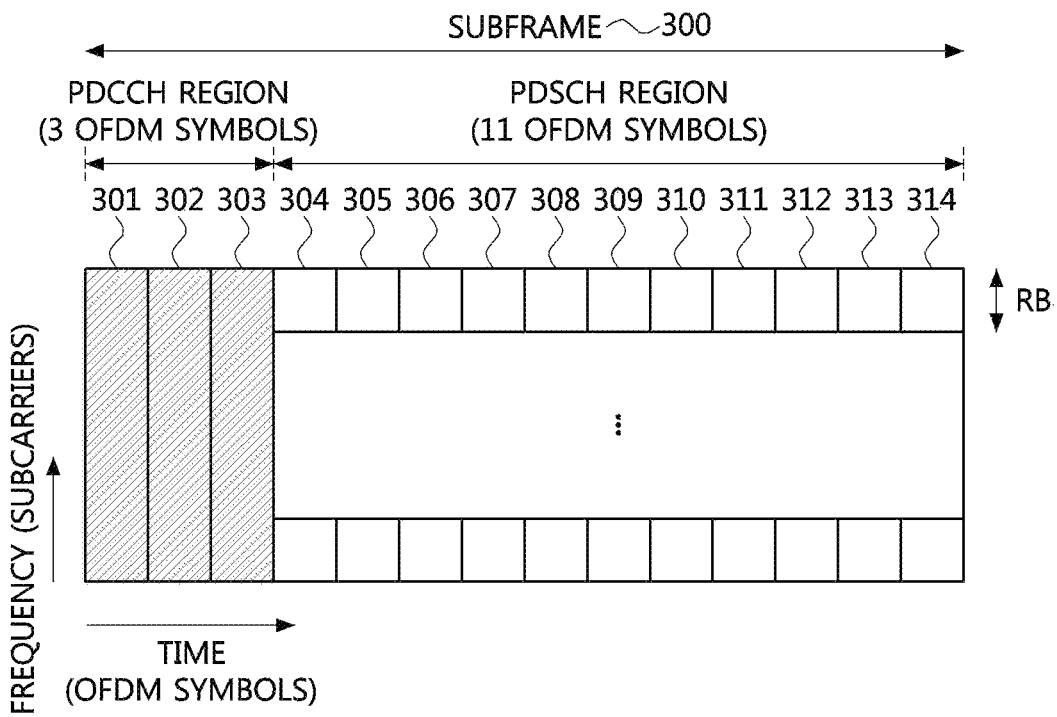
FIG. 3 is a conceptual diagram illustrating a downlink subframe structure in a mobile communication system according to a first embodiment of the present disclosure.

FIG. 3 is a conceptual diagram illustrating a downlink subframe structure in a mobile communication system according to a first embodiment of the present disclosure.

Referring to FIG. 3, in the mobile communication system, a downlink subframe 300 may be composed of 14 orthogonal frequency division multiplexing (OFDM) symbols 301 to 314. Here, the mobile communication system may be a long term evolution (LTE) system based on an orthogonal frequency division multiple access (OFDMA) scheme.

Here, the first to third symbols 301 to 303 may belong to a physical downlink control channel (PDCCH) region for transmitting control information. In the downlink subframe 300, the PDCCH region may vary in accordance with the amount of control information.

In the downlink subframe 300, a region subsequent to the PDCCH region may be a physical downlink shared channel (PDSCH) region for transmitting data. The PDSCH may be distributed over the entire band of the mobile communication system.

Also, the PDSCH may be configured in units of resource blocks (RBs) each of which is a basic unit of scheduling. Here, one RB may be composed of 12 subcarriers. The number of RBs in the PDSCH region may vary depending on the bandwidth of the mobile communication system. For example, the bandwidth of the mobile communication system may be 1.4 MHz, 3 MHz, 5 MHz, 10 MHz, 15 MHz, 20 MHz, or the like. Here, the number of RBs according to each bandwidth of the mobile communication system may be 6, 15, 25, 50, 75, 100, or the like.

In the mobile communication system, a base station may transmit control information and data to each of a plurality of terminals in units of subframes 300. Each of the plurality of terminals may receive the control information and the data from the base station. For example, the terminal may receive the control information from the base station through a PDCCH. Also, the terminal may receive the data from the base station through a PDSCH. Here, the terminal may decode the control information and obtain modulation and coding scheme (MCS) information and scheduling information for the terminal. Then, the terminal may decode the data based on the obtained MCS information and scheduling information. Here, when the terminal fails to decode the control information received through the PDCCH of the subframe 300, the terminal may not decode the data received through the PDSCH of the subframe 300.

Figure 4:
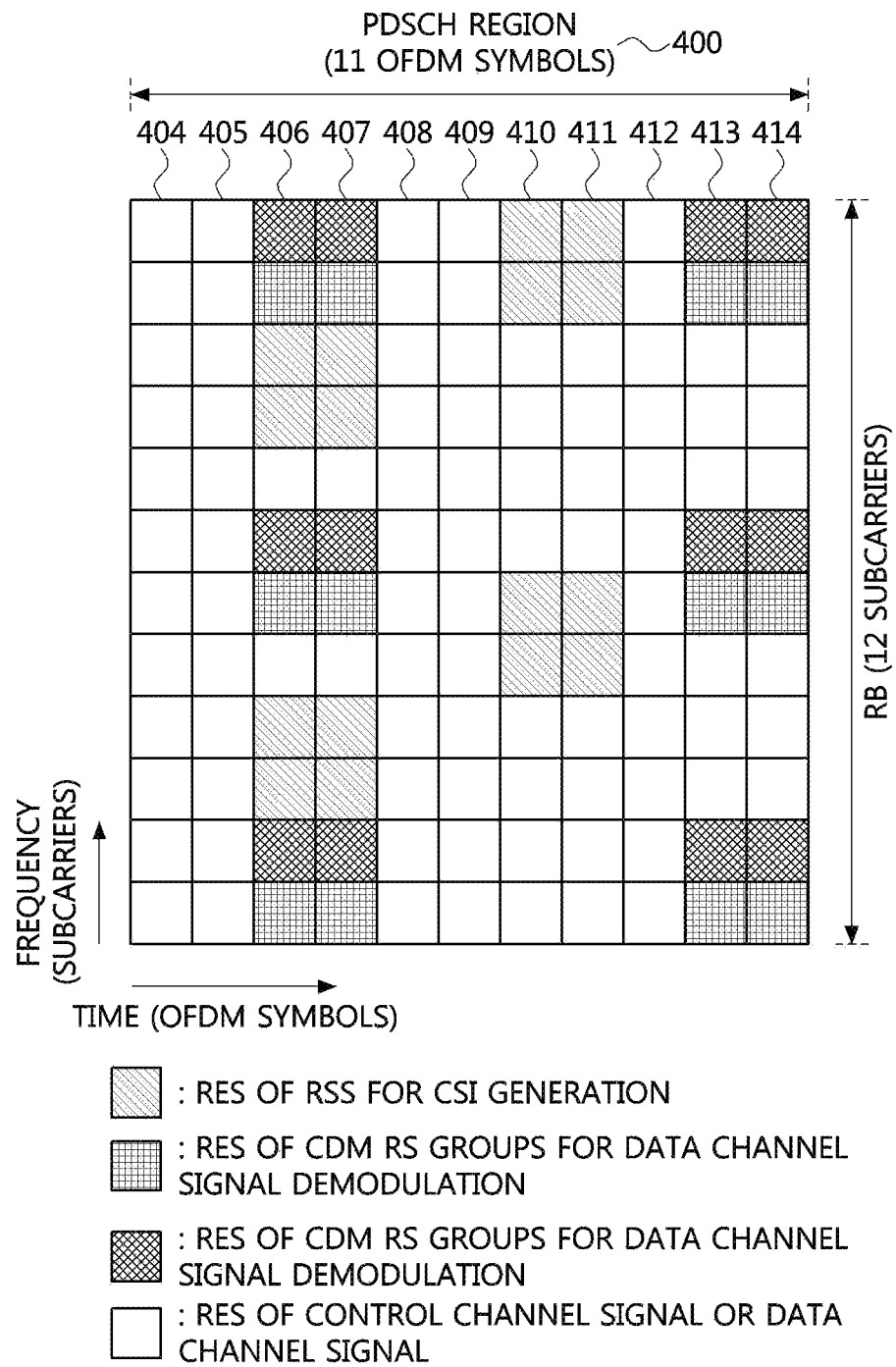
FIG. 4 is a conceptual diagram illustrating a structure of an RB in a PDSCH region of a downlink subframe in a mobile communication system according to a first embodiment of the present disclosure.

FIG. 4 is a conceptual diagram illustrating a structure of an RB in a PDSCH region of a downlink subframe in a mobile communication system according to a first embodiment of the present disclosure.

Referring to FIG. 4, in the mobile communication system, the PDSCH region 400 may be composed of 11 OFDM symbols. Here, the PDSCH region 400 may be the same as or similar to the PDSCH region of FIG. 3.

Each of the RBs in the PDSCH region 400 may include resource elements (REs) for transmitting various types of reference signals (RSs). For example, the RSs may include a channel state information RS (CSI-RS) for generating a CSI and a demodulation reference signal (DMRS) for demodulating data.

For example, the base station may transmit the RSs to the terminal via each RB. The terminal may receive the RSs from the base station via each RB. Here, the terminal may generate a CSI for each frequency subband based on the RSs received from the base station. Here, the frequency subband may be composed of a plurality of RBs located consecutively. The terminal may transmit the generated CSI to the base station. The base station may receive the CSI from the terminal, and perform scheduling for the terminal based on the CSI received from the terminal.

In the mobile communication system, a base station and a terminal operating in a frequency band of 6 GHz or above may use a bandwidth of several hundred MHz or several GHz for wireless communications. That is, the total number of RBs in such the broadband mobile communication system may be several hundreds to several thousands. In this case, the number of RSs may be increased by the number of RBs increased in the broadband mobile communication system. That is, in the broadband mobile communication system, the terminal may generate a CSI for each of the increased RSs. Therefore, in the broadband mobile communication system, the terminal may generate the excessive amount of CSIs. Also, in the broadband mobile communication system, the terminal may transmit the excessive amount of CSIs to the base station, so that the terminal may consume the excessive amount of power.

Also, in the broadband mobile communication system, the base station may receive the excessive amount of CSIs from the terminal. At this time, the base station may perform scheduling based on the excessive amount of CSIs. Therefore, scheduling complexity of the base station may be increased. Also, a processing time of the base station may be increased due to the increase in the scheduling complexity of the base station.

Also, in the broadband mobile communication system, the amount of control information that the base station should transmit to the terminal may increase due to the increase of radio resource regions. Therefore, in the broadband mobile communication system, the expansion of the control channel region may be required as the amount of control information increases.

Figure 5:
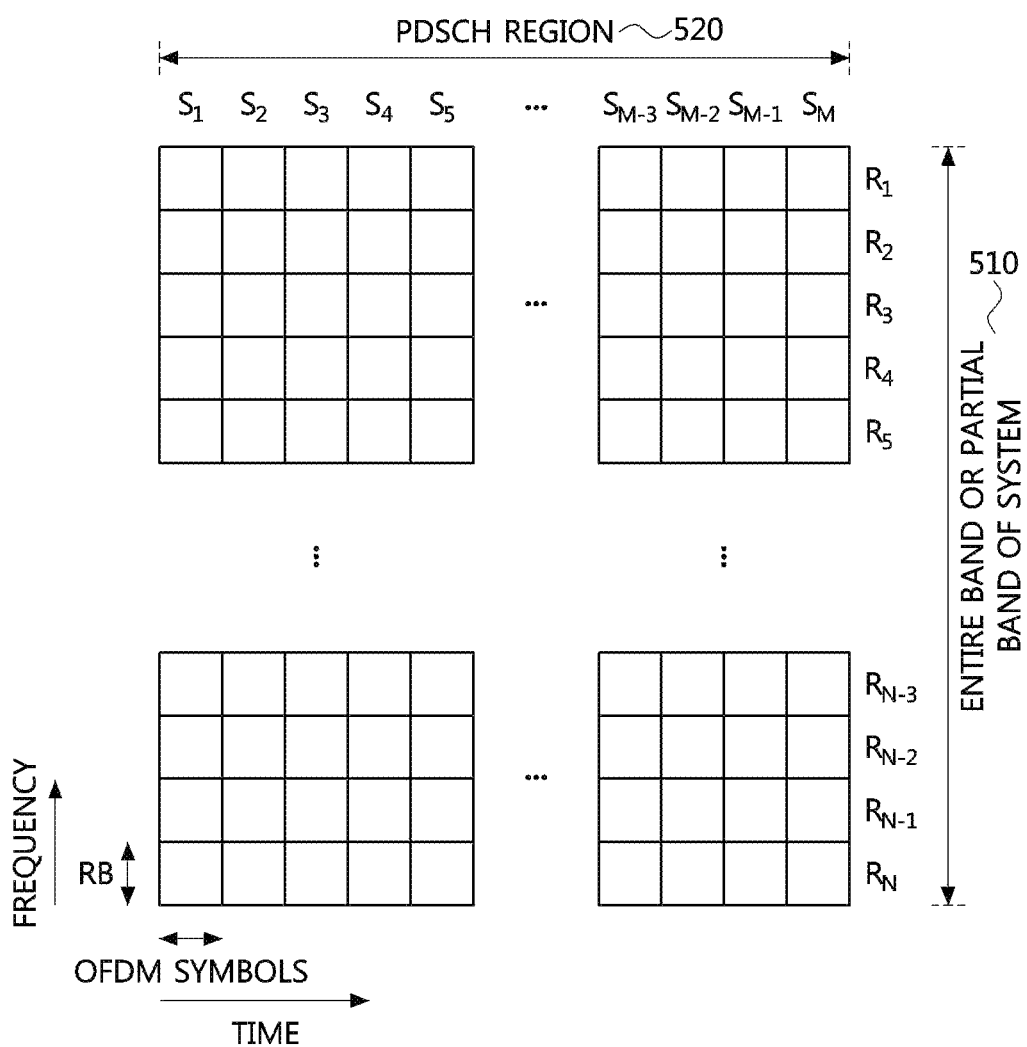
FIG. 5 is a conceptual diagram illustrating a structure of a PDSCH region in a downlink subframe in a broadband mobile communication system according to a first embodiment of the present disclosure.

FIG. 5 is a conceptual diagram illustrating a structure of a PDSCH region in a downlink subframe in a broadband mobile communication system according to a first embodiment of the present disclosure.

Referring to FIG. 5, in the broadband mobile communication system, a PDSCH region 520 in a subframe may be composed of a plurality of OFDM symbols. Here, the subframe may be the same as or similar to the subframe 300 of FIG. 3. Also, the PDSCH region 520 may be the same as or similar to the PDSCH region of FIG. 3.

For example, the PDSCH region 510 may include symbols $S_1$ through $S_M$. Here, $S_1$ to $S_M$ may denote symbol numbers. In addition, M may denote the total number of symbols in the PDSCH region 520.

The $S_1$ may vary according to the size of the PDCCH region in the subframe. Here, the PDCCH region may be the same as or similar to the PDCCH region of FIG. 3. For example, when the number of OFDM symbols in the PDCCH region in the subframe is 2, $S_1$ may be 3 and $S_2$ may be 4. That is, the first and second symbols in the subframe may belong to the PDCCH region, and the symbols after the second symbol may belong to the PDSCH region.

The PDSCH region 520 may be configured in a band 510 (e.g., an entire band or a partial band of the system band) of the mobile communication system. For example, in the broadband mobile communication system, the PDSCH region 520 may be configured to a plurality of RBs. That is, in the broadband mobile communication system, the PDSCH region 520 may include RBs $R_1$ through $R_N$. Here, $R_1$ to $R_N$ may denote RB numbers. That is, N may also denote the total number of RBs in the band 510 of the broadband mobile communication system. For example, in the LTE system, the base station and the terminal may use a bandwidth of 10 MHz as the band 510. Here, the number of RBs may be 50. That is, $R_1$ may be 1, $R_2$ may be 2, . . . , and $R_{50}$ may be 50.

In a broadband mobile communication system according to a second embodiment of the present disclosure, the base station may allocate radio resources of different regions to a plurality of terminals through scheduling. That is, each of the plurality of terminals may use radio resources of a different region. In other words, in the broadband mobile communication system, the base station may perform scheduling in a manner different from a method of allocating an entire frequency band to all the terminals in the conventional mobile communication system.

In a broadband mobile communication system, the base station may classify a plurality of terminals into a plurality of terminal groups. Here, the base station may allocate a different radio resource region to each of the plurality of terminal groups. That is, each of the plurality of terminal groups may use a different radio resource region. For example, each terminal may reduce the power consumption for generating CSIs by receiving RSs only through the assigned radio resource region. Also, the base station may configure a radio resource region for each of the plurality of terminal groups, thereby performing scheduling for the terminals to which the radio resource region is assigned. Thus, the base station may reduce a computational complexity and a time delay for the scheduling.

Operations of the base station for performing scheduling and the terminal for receiving data according to a scheduling result will be described in detail with reference to FIGS. 6A and 6B.

Figure 6A:
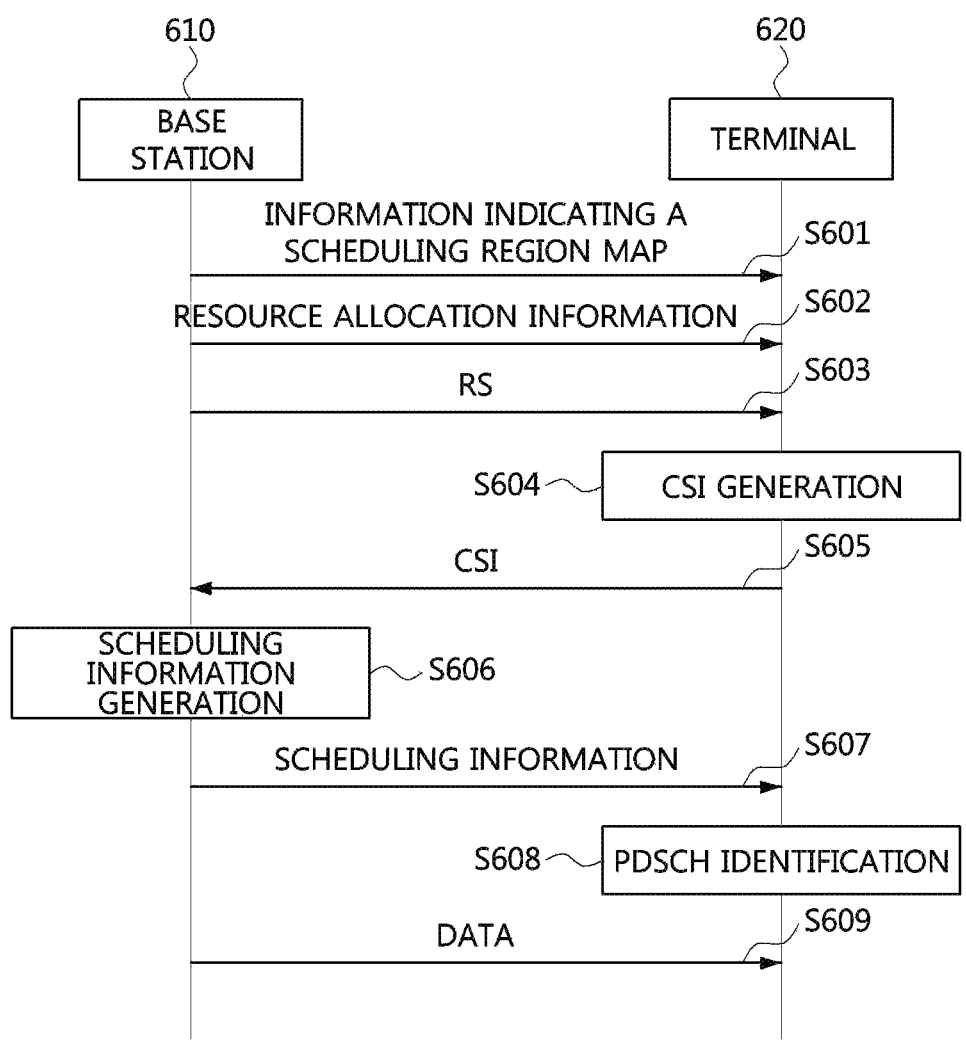
FIGS. 6A and 6B are sequence charts illustrating signal flows between a base station and a terminal in a broadband mobile communication system according to a second embodiment of the present disclosure.
Figure 6B:
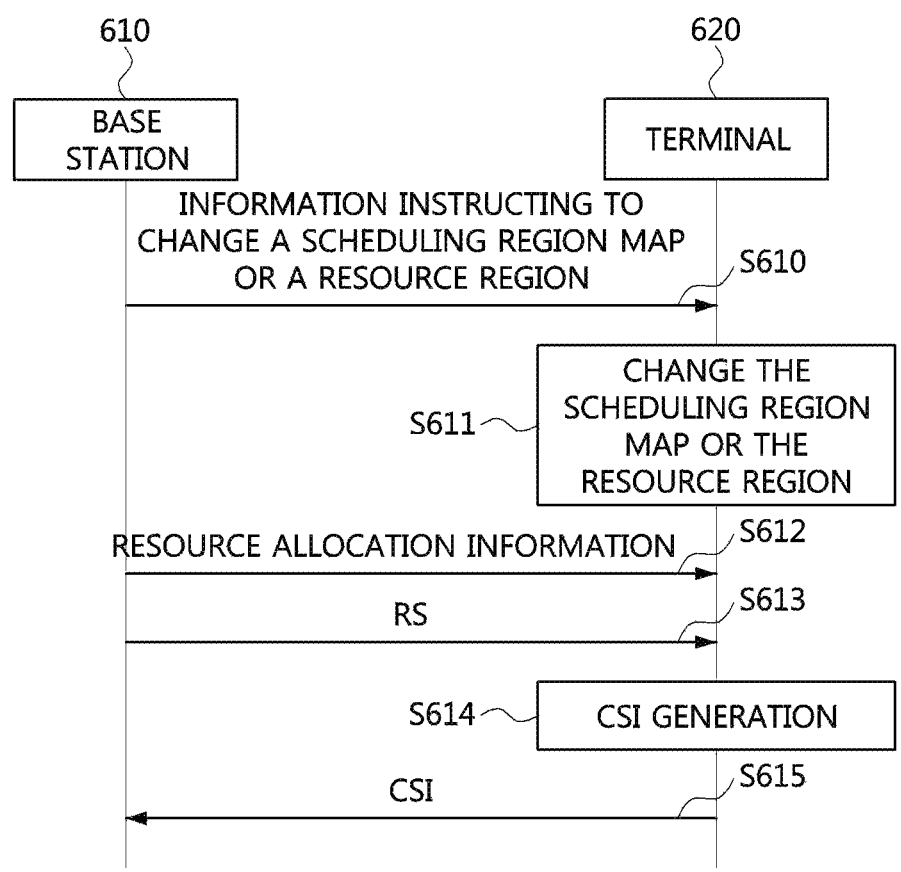

FIGS. 6A and 6B are sequence charts illustrating signal flows between a base station and a terminal in a broadband mobile communication system according to a second embodiment of the present disclosure.

Referring to FIG. 6A, in the broadband mobile communication system, a base station 610 may transmit information indicating a scheduling region map to a terminal 620 (S601). The terminal 620 may then receive the information indicating the scheduling area map from the base station 610.

Here, the scheduling region map may be in a form of a map in which the entire radio resources or some radio resources are segmented. For example, the scheduling region map may indicate that the entire radio resources or some radio resources are segmented into various resource regions according to predetermined various sizes. That is, the scheduling region map may represent a plurality of different resource regions segmented from the entire radio resources or some radio resources. That is, the scheduling region map may indicate a position of each of the plurality of resource regions. Also, the scheduling region map may indicate OFDM symbols and RBs included in each of the plurality of resource regions. For example, the scheduling region map may be configured to be the same as or similar to the scheduling region maps 700 to 1000 to be described in FIGS. 7 to 10 below.

Figure 7:
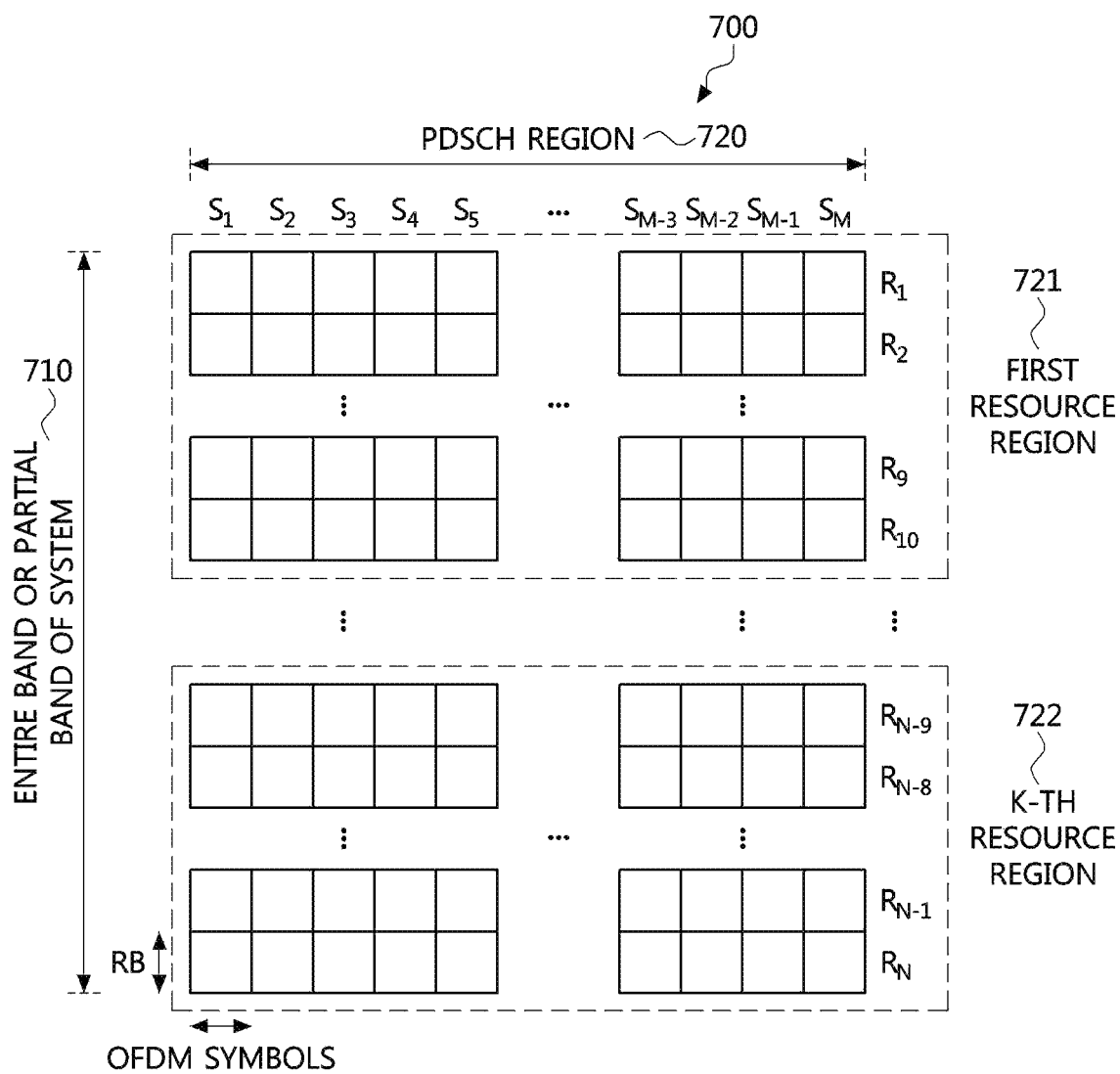
FIG. 7 is a conceptual diagram illustrating a structure of a PDSCH region segmented into resource regions each of which has a same number of RBs in a broadband mobile communication system according to a second embodiment of the present disclosure.

FIG. 7 is a conceptual diagram illustrating a structure of a PDSCH region segmented into resource regions each of which has a same number of RBs in a broadband mobile communication system according to a second embodiment of the present disclosure.

Referring to FIG. 7, the scheduling region map 700 may represent a plurality of resource regions 721 and 722 segmented in the frequency axis in the PDSCH region 720 of an entire band or a partial band 710 of the broadband mobile communication system. Here, the entire band or the partial band 710 of the broadband mobile communication system may include N RBs (e.g., $R_1$ to $R_N$). Also, the PDSCH region 720 may comprise M symbols $S_1$ to $S_M$.

In this case, the scheduling region map 700 may represent a plurality of resource regions each of which includes the same number of RBs. For example, a first resource region 721 may include a first RB $R_1$ to a tenth RB $R_{10}$. That is, the first resource region 721 may include 10 RBs. Also, the K-th resource region 722 may include an (N-9)-th RB $R_{N-9}$ to an N-th RB $R_N$. Likewise, the K-th resource region 722 may include 10 RBs.

Figure 8:
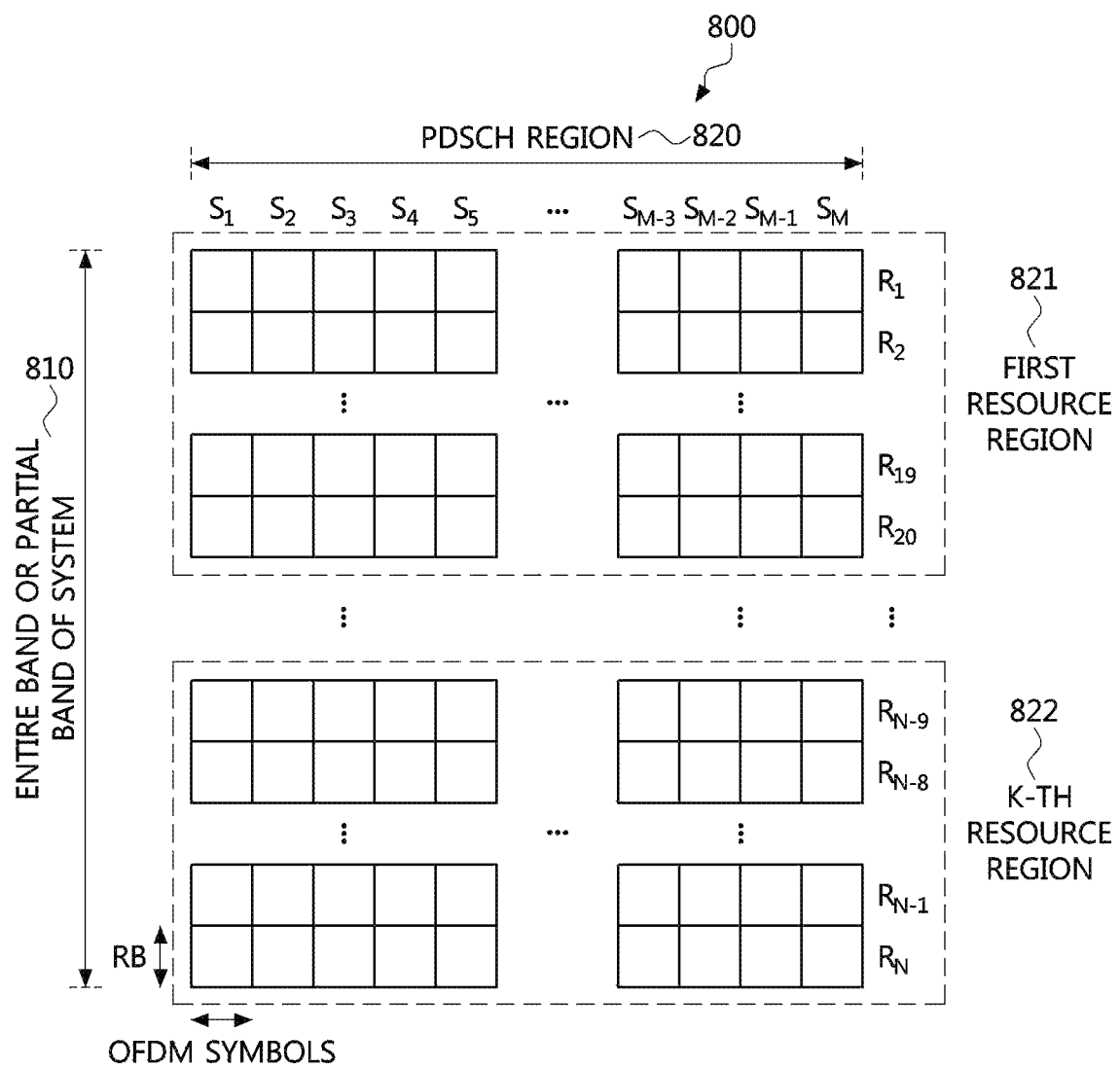
FIG. 8 is a conceptual diagram illustrating a structure of a PDSCH region segmented into resource regions each of which has a different number of RBs in a broadband mobile communication system according to a second embodiment of the present disclosure.

Also, a scheduling region map may represent a plurality of resource regions each of which includes a different number of RBs as shown in FIG. 8 below.

FIG. 8 is a conceptual diagram illustrating a structure of a PDSCH region segmented into resource regions each of which has a different number of RBs in a broadband mobile communication system according to a second embodiment of the present disclosure.

Referring to FIG. 8, the scheduling region map 800 may represent a plurality of resource regions 821 and 822 segmented in the frequency axis in the PDSCH region 820 of an entire band or a partial band 810 of the broadband mobile communication system. Here, the entire band or the partial band 810 of the broadband mobile communication system may include N RBs (e.g., $R_1$ to $R_N$). Also, the PDSCH region 820 may comprise M symbols $S_1$ to $S_M$.

In this case, the scheduling region map 800 may represent a plurality of resource regions each of which includes the different number of RBs. For example, a first resource region 821 may include a first RB $R_1$ to a twentieth RB $R_{20}$. That is, the first resource region 821 may include 20 RBs. Also, a K-th resource region 822 may include an (N-9)-th RB $R_{N-9}$ to an N-th RB $R_N$. Likewise, the K-th resource region 822 may include 10 RBs.

Figure 9:
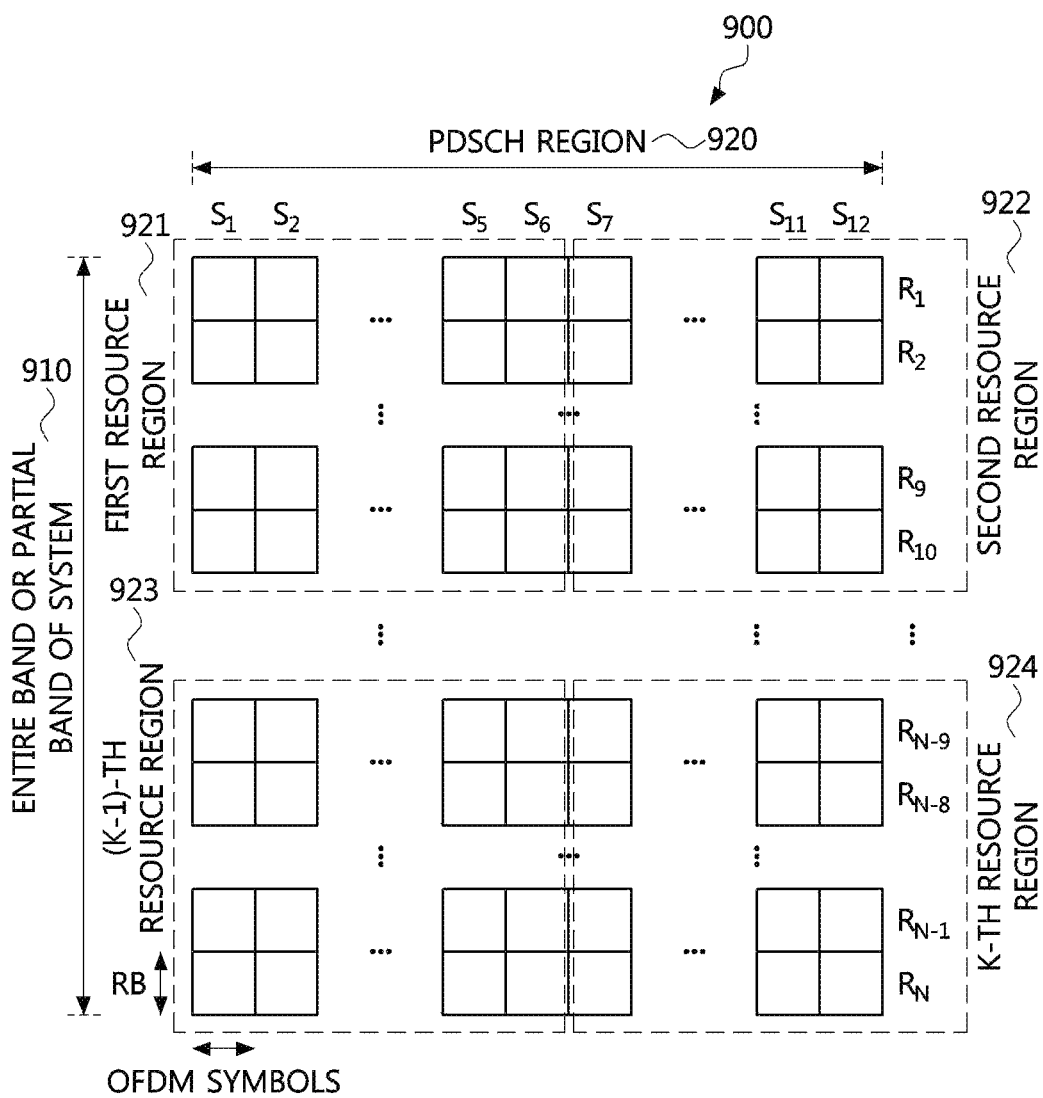
FIG. 9 is a conceptual diagram illustrating a structure of a PDSCH region segmented into resource regions each of which has a same number of OFDM symbols in a broadband mobile communication system according to a second embodiment of the present disclosure.

Also, a scheduling region map may represent a plurality of resource regions each of which includes the same number of RBs and the same number of symbols as shown in FIG. 9 below.

FIG. 9 is a conceptual diagram illustrating a structure of a PDSCH region segmented into resource regions each of which has a same number of OFDM symbols in a broadband mobile communication system according to a second embodiment of the present disclosure.

Referring to FIG. 9, the scheduling region map 900 may represent a plurality of resource regions 921 and 924 segmented in the frequency axis in the PDSCH region 920 of an entire band or a partial band 910 of the broadband mobile communication system. Here, the entire band or the partial band 910 of the broadband mobile communication system may include N RBs $R_1$ to $R_N$. Also, the PDSCH region 920 may include 12 symbols $S_1$ to $S_{12}$. Here, the scheduling region map 900 may be composed of the plurality of resource regions 921 to 924 each of which includes the same number of RBs and the same number of OFDM symbols.

For example, the first resource region 921 may include the first symbol $S_1$ through the sixth symbol $S_6$ of each of the first RB $R_1$ to the tenth RB $R_{10}$. That is, the first resource region 921 may include 10 RBs each of which is composed of 6 symbols. Also, the second resource region 922 may include the seventh symbol $S_1$ through the twelfth symbol $S_{12}$ of each of the first RB $R_1$ to the tenth RB $R_{10}$. That is, the second resource region 922 may include 10 RBs each of which is composed of 6 symbols.

Also, the (K-1)-th resource region 923 may include the first symbol $S_1$ to the sixth symbol So of each of the (N-9)-th RB $R_{N-9}$ to the N-th RB $R_N$. That is, the (K-1)-th resource region 923 may include 10 RBs each of which is composed of 6 symbols. Also, the K-th resource region 924 may include the seventh symbol $S_7$ to the twelfth symbols $S_{12}$ of each of the (N-9)-th RB $R_{N-9}$ to the N-th RB $R_N$. That is, the K-th resource region 924 may include 10 RBs each of which is composed of 6 symbols.

Figure 10:
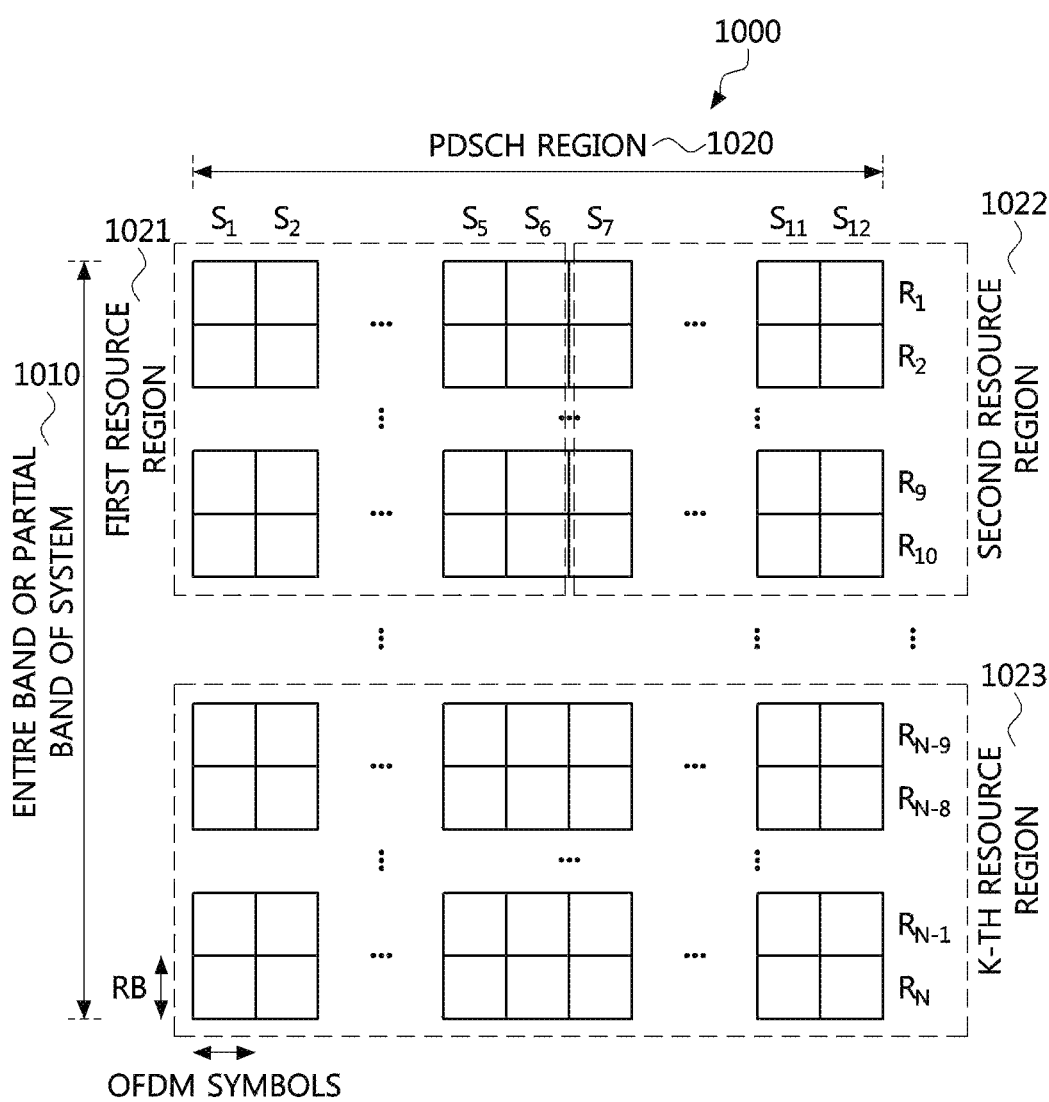
FIG. 10 is a conceptual diagram illustrating a structure of a PDSCH region segmented into resource regions each of which has a different number of OFDM symbols in a broadband mobile communication system according to a second embodiment of the present disclosure.

Also, a scheduling region map may represent a plurality of resource regions each of which includes a different number of symbols as shown in FIG. 10 below.

FIG. 10 is a conceptual diagram illustrating a structure of a PDSCH region segmented into resource regions each of which has a different number of OFDM symbols in a broadband mobile communication system according to a second embodiment of the present disclosure.

Referring to FIG. 10, the scheduling region map 1000 may represent a plurality of resource regions 1021 and 1023 segmented in the frequency axis in the PDSCH region 1020 of an entire band or a partial band 1010 of the broadband mobile communication system. Here, the entire band or the partial band 1010 of the broadband mobile communication system may include N RBs $R_1$ to $R_N$. Also, the PDSCH region 1020 may include 12 symbols $S_1$ to $S_{12}$. Here, the scheduling region map 1000 may be composed of the plurality of resource regions 1021 to 1023 each of which includes the same number or the different number of symbols.

For example, the first resource region 1021 may include the first symbol $S_1$ through the sixth symbol $S_6$ of each of the first RB $R_1$ to the tenth RB $R_{10}$. That is, the first resource region 1021 may include 10 RBs each of which is composed of 6 symbols. Also, the second resource region 1022 may include the seventh symbol $S_7$ through the twelfth symbol $S_{12}$ of each of the first RB $R_1$ to the tenth RB $R_{10}$. That is, the second resource region 1022 may include 10 RBs each of which is composed of 6 symbols.

Also, the K-th resource region 1023 may include the first symbol $S_1$ to the twelfth symbols $S_{12}$ of each of the (N-9)-th RB $R_{N-9}$ to the N-th RB $R_N$. That is, the K-th resource region 1023 may include 10 RBs each of which is composed of 12 symbols.

Referring again to FIG. 6A, the information indicating the scheduling region map may be transmitted through a radio resource control (RRC) message. Alternatively, the information indicating the scheduling region map may be broadcast via a physical broadcast channel (PBCH). Also, the information indicating the scheduling region map may indicate the starting position and the number of RBs constituting the plurality of resource regions included in the scheduling region map. Here, the index of the first RB in the resource region may be zero. Alternatively, the information indicating the scheduling region map may indicate the starting positions and the numbers of symbols and RBs constituting the plurality of resource regions included in the scheduling region map.

The terminal 620 may identify the plurality of resource regions based on the information indicating the scheduling region map received from the base station.

The base station 610 may then transmit resource allocation information to the terminal (S602). The terminal 620 may receive the resource allocation information from the base station 610. Here, the resource allocation information may be information indicating a resource region allocated to the terminal 620 among the plurality of resource regions included in the scheduling region map.

The base station 610 may transmit an RS to the terminal 620 (S603). The terminal 620 may receive the RS from the base station 610. Here, the RS may be an RS transmitted through the resource region allocated to the terminal 620. The terminal 620 may generate a CSI based on the RS received from the base station 610 (S604). For example, the CSI may indicate a channel state of the resource region through which the RS is transmitted.

The terminal 620 may transmit the CSI to the base station 610 (S605). The base station 610 may receive the CSI from the terminal 620. The base station 610 may perform scheduling for the terminal 620 based on the CSI received from the terminal 620.

The base station 610 may generate scheduling information including a scheduling result for the terminal 620 (S606). For example, the scheduling information may include information indicating a resource of a PDSCH for the terminal 620 to receive data. Here, the PDSCH may be located in the PDSCH region of FIG. 3.

The base station 610 may transmit the scheduling information to the terminal 620 (S607). The terminal 620 may receive the scheduling information from the base station 610. The base station 610 may transmit the scheduling information to the terminal 620 via a PDCCH. For example, the base station 610 may transmit a DCI including the scheduling information to the terminal 620 via the PDCCH. Here, the PDCCH may be located in the PDCCH region of FIG. 3.

The terminal 620 may identify the resource for receiving the data through the PDSCH based of the scheduling information received front the base station 610 (S608).

The base station 610 may transmit data to the terminal 620 through the resource of the PDSCH indicated by the scheduling information (S609). The terminal 620 may receive the data from the base station 610 through the resource of the PDSCH indicated by the scheduling information.

Referring to FIG. 6B, the base station 610 may transmit information instructing to change the scheduling region map or the resource region to the terminal 620. The terminal 620 may receive from the base station 610 the information instructing to change the scheduling region map or the resource region.

On the basis of the information instructing to change the scheduling region map or the resource region, the terminal 620 may change the scheduling region map or the resource region (S611). For example, the terminal 620 may change the scheduling region map or the resource region currently being used to another (i.e. new) scheduling region map or another resource region based on the information instructing to change the scheduling region map or the resource region.

The base station 610 may transmit resource allocation information to the terminal 620 (S612). That is, the base station 610 may transmit to the terminal 620 resource allocation information indicating a resource region allocated to the terminal among a plurality of resource regions included in a changed scheduling region map. The terminal 620 may receive from the base station 610 the resource allocation information indicating the resource region allocated to the terminal 620 among the plurality of resource regions included in the changed scheduling region map. The terminal 620 may identify the resource region allocated to it based on the resource allocation information.

The base station 610 may transmit an RS to the terminal 620 through the resource region allocated to the terminal 620 (S613). The terminal 620 may receive the RS from the base station 610 through the allocated resource region. The terminal 620 may generate a CSI for the allocated resource region based on the RS (S614). The terminal 620 may transmit the CSI to the base station (S615). The base station 610 may receive the CSI from the terminal 620.

Figure 11A:
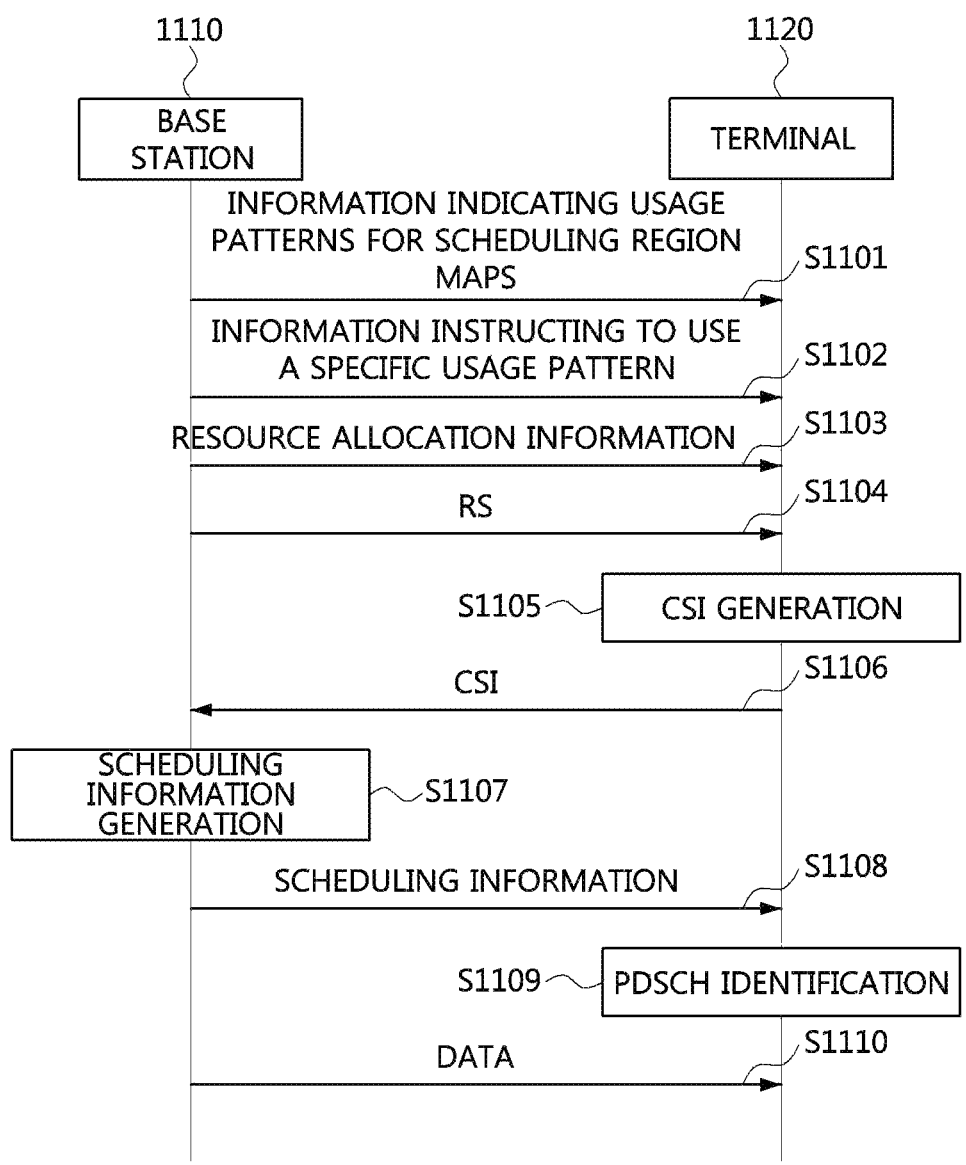
FIGS. 11A and 11B are sequence charts illustrating signal flows between a base station and a terminal in a broadband mobile communication system according to a third embodiment of the present disclosure.
Figure 11B:
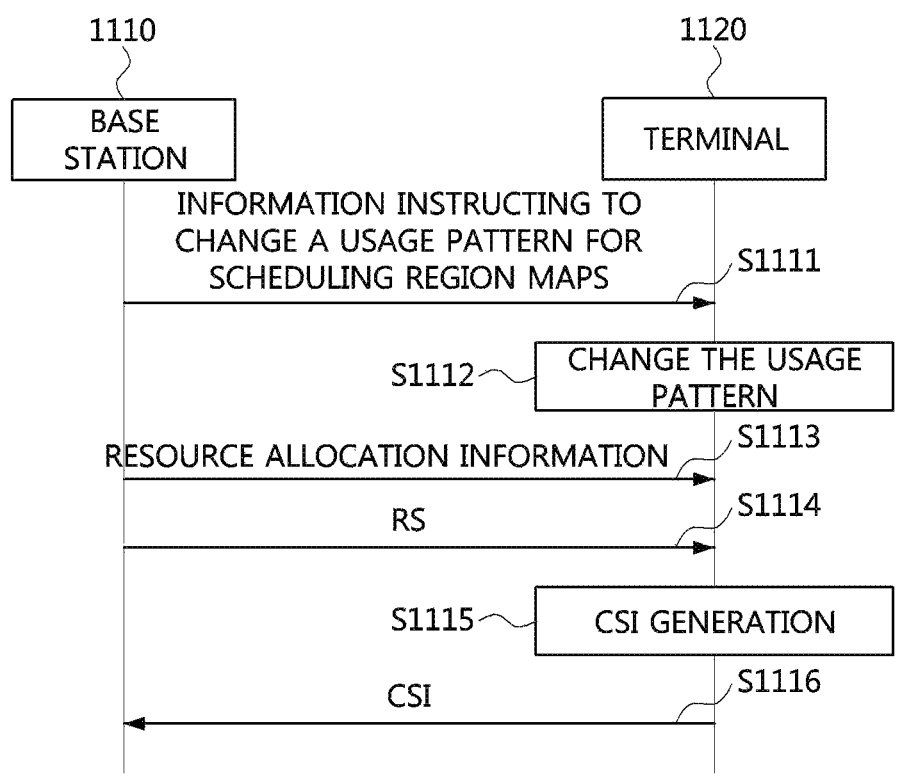

FIGS. 11A and 11B are sequence charts illustrating signal flows between a base station and a terminal in a broadband mobile communication system according to a third embodiment of the present disclosure.

Referring to FIG. 11A, a base station 1110 in the broadband mobile communication system may transmit information indicating usage patterns for scheduling region maps to the terminal 1120 (S1101). Here, the information indicating the usage patterns for the scheduling region maps may be configured to be the same as or similar to usage pattern information 1200 for the scheduling region map in FIG. 12 to be described below.

FIG. 12 is a conceptual diagram illustrating usage pattern information for scheduling region maps in a broadband mobile communication system according to a third embodiment of the present disclosure.

Referring to FIG. 12, the usage pattern information 1200 for the scheduling region maps may be in a form of a look-up table composed of a plurality of fields. For example, the usage pattern information 1200 may include an change configuration number field 1210, a change period field 1220, and a frame number field 1230.

The change configuration number field 1210 may indicate a period for changing a scheduling region map to be used and the number of the scheduling region map used in a specific frame or specific frames. In other words, the change configuration number field 1210 may represent a number indicating a pattern using a plurality of scheduling region maps according to a preset time period.

Here, the preset time period may correspond to a time period included in the change period field 1220. Also, the pattern using the scheduling region maps may refer to a pattern of the scheduling region maps, which are changed according to a frame number in the frame number field 1230. The frame number field 1230 may indicate the number of the scheduling region map corresponding to the frame number.

For example, '0' in the change configuration number field 1210 may instruct to change the scheduling region map every 10 ms. That is, the '0' in the change configuration number field 1210 may indicate that the scheduling region map is to be changed every 10 ms frame. For example, referring to FIG. 12, the '0' in the change configuration number field 1210 may indicate that a scheduling region map #1 is to be used in a subframe #0, a scheduling region map #2 is to be used in a subframe #1, a scheduling region map #3 is to be used in a subframe #2, and a scheduling region map #10 is to be used in a subframe #9. Here, the scheduling region map may be configured to be the same as or similar to at least one of the scheduling region maps 700 to 1000 of FIGS. 7 to 10.

Also, referring to FIG. 12, '1' and '2' in the change configuration number field 1210 may instruct to change the scheduling region map every 20 ms. That is, the '1' and '2' in the change configuration number field 1210 may indicate that the scheduling region map is to be changed every two frames which last for 20 ms. For example, the '1' in the change configuration number field 1210 may indicate that a scheduling region map #1 is to be used in subframes #0 and #1, a scheduling region map #2 is to be used in subframes #2 and #3, a scheduling region map #3 is to be used in subframes #4 and #5, a scheduling region map #4 is to be used in subframes #6 and #7, and a scheduling region map #5 is to be used in subframes #8 and #9. For example, the '2' in the change configuration number field 1210 may indicate that a scheduling region map #1 is to be used in subframes #0 and #1, a scheduling region map #3 is to be used in subframes #2 and #3, a scheduling region map #5 is to be used in subframes #4 and #5, a scheduling region map #7 is to be used in subframes #6 and #7, and a scheduling region map #9 is to be used in subframes #8 and #9.

Also, referring to FIG. 12, '3' to '5' in the change configuration number field 1210 may instruct to change the scheduling region map every 50 ms. That is, the '3' to '5' in the change configuration number field 1210 may indicate that the scheduling region map is to be changed every five frames which last for 50 ms. For example, the '3' in the change configuration number field 1210 may indicate that a scheduling region map #1 is to be used in subframes #0 to #4, and a scheduling region map #2 is to be used in subframes #5 to #9. Also, the '4' in the change configuration number field 1210 may indicate that a scheduling region map #3 is to be used in subframes #0 to #4, and a scheduling region map #4 is to be used in subframes #5 to #9. Also, the '5' in the change configuration number field 1210 may indicate that a scheduling region map #5 is to be used in subframes #0 to #4, and a scheduling region map #6 is to be used in subframes #5 to #9.

Also, '6' and '7' in the change configuration number field 1210 may instruct to use a single scheduling region map for all frames without the change cycle. For example, the '6' in the change configuration number field 1210 may indicate that a scheduling region map #1 is to be used in all the subframes. Also, the '7' in the change configuration number field 1210 may indicate that a scheduling region map #2 is to be used in all the subframes.

Referring again to FIG. 11A, the terminal 1120 may receive the information indicating usage patterns for the scheduling region maps from the base station 1110. The terminal 1120 may identify a plurality of usage patterns for the scheduling region maps based on the information indicating the usage patterns for the scheduling region maps from the base station 1110.

The base station 1110 may transmit information instructing to use a specific usage pattern to the terminal 1120 (S1102). The terminal 1120 may receive the information instructing to use the usage pattern from the base station 1110. Here, the information instructing to use of the specific usage pattern may be a message indicating one of the plurality of numbers in the change configuration number field 1210 of FIG. 12. For example, the information instructing to use the specific usage pattern may be a message indicating '0' in the change configuration number field 1210 in FIG. 12.

The base station 1110 may transmit resource allocation information to the terminal 1120 (S1103). The terminal 1120 may receive the resource allocation information from the base station 1110. Here, the resource allocation information may indicate a resource region allocated to the terminal 1120 among a plurality of resource regions included in the scheduling region maps #1 to #10 indicated by the '0' in the change configuration number field 1210 of FIG. 12.

The resource allocation information may indicate the starting position and the number of RBs constituting the resource region. Alternatively, the resource allocation information may indicate the starting positions and the numbers of symbols and RBs constituting the plurality of resource regions included in the scheduling region map.

The base station 1110 may transmit an RS to the terminal 1120 through the resource region allocated to the terminal 1120 (S1104). The terminal 1120 may receive the RS from the base station 1110 through the allocated resource region.

The terminal 1120 may generate a CSI based on the RS received from the base station 1110 (S1105). For example, the CSI may indicate a channel state of the resource region through which the RS is transmitted.

The terminal 1120 may transmit the CSI to the base station 1110 (S1106). The base station 1110 may receive the CSI from the terminal 1120.

The base station 1110 may perform scheduling for the terminal 1120 based on the CSI received from the terminal 1120. The base station 1110 may generate scheduling information indicating a scheduling result for the terminal 1120 (S1107).

The base station 1110 may transmit the scheduling information to the terminal 1120 (S1108). The terminal 1120 may receive the scheduling information from the base station 1110. For example, the base station 1110 may transmit a DCI including the scheduling information to the terminal 1120 via a PDCCH. Here, the PDCCH may be located in the PDCCH region of FIG. 3.

The terminal 1120 may identify a resource for receiving data on the PDSCH based on the scheduling information received from the base station 1110 (S1109). Here, the PDSCH may be located in the PDSCH region of FIG. 3.

The base station 1110 may transmit the data to the terminal 1120 through the resource of the PDSCH indicated by the scheduling information (S1110). The terminal 1120 may receive the data from the base station B 1110 through the resource of the PDSCH indicated by the scheduling information.

Referring to FIG. 11B, the base station 1110 may transmit information instructing to change the usage pattern for the scheduling region map to the terminal 1120 (S1111). The terminal 1120 may receive the information instructing to change the usage pattern for the scheduling region map from the base station 1110.

For example, the terminal 1120 may use a usage pattern corresponding to the number '0' in the change configuration number field 1210 of FIG. 12. At this time, the information instructing to change the usage pattern of the scheduling region map may indicate that the '1' in the change configuration number field 1210 of FIG. 12 is to be used. That is, the terminal 1120 may receive from the base station 1110 the information instructing to change the usage pattern for the scheduling region map to the usage pattern corresponding to the '1' in the change configuration number field 1210 shown in FIG. 12.

The terminal 1120 may change the usage pattern for the scheduling region map based on the information instructing to change the usage pattern for the scheduling region map received from the base station 1110 (S1112). For example, based on the information instructing to change the usage pattern for the scheduling region map received from the base station 1110, the terminal 1120 may change the currently-used usage pattern corresponding to the '0' in the change configuration number field 1210 of FIG. 12 to the usage pattern corresponding to the '1' in the change configuration number field 1210 of FIG. 12.

The base station 1110 may transmit resource allocation information to the terminal 1120 (S1113). The terminal 1120 may receive the resource allocation information from the base station 1110. Here, the resource allocation information may indicate a resource region allocated to the terminal 1120 among a plurality of resource regions constituting the scheduling region maps according to the usage pattern corresponding to the '1' in the change configuration number field of FIG. 12.

The resource allocation information may indicate the starting position and the number of RBs constituting the resource region. Alternatively, the resource allocation information may indicate the starting positions and the numbers of symbols and RBs constituting the plurality of resource regions included in the scheduling region map.

The base station 1110 may transmit an RS to the terminal 1120 through the resource region allocated to the terminal 1120 (S1114). The terminal 1120 may receive the RS from the base station 1110 through the allocated resource region.

The terminal 1120 may generate a CSI based on the RS received from the base station 1110 (S1115). For example, the CSI may indicate a channel state of the resource region through which the RS is transmitted.

The terminal 1120 may transmit the CSI to the base station 1110 (S1116). The base station 1110 may receive the CSI from the terminal 1120.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a mobile communication system, the operation method comprising:
receiving from a base station information indicating usage patterns for a plurality of scheduling region maps, each of the plurality of scheduling region maps consisting of a plurality of resource regions;
receiving from the base station information indicating a first usage pattern among the usage patterns;
receiving first resource allocation information indicating a first resource region allocated to the terminal among the plurality of resource regions constituting the plurality of scheduling region maps according to the first usage pattern;
receiving a first reference signal (RS) from the base station through the first resource region;
generating a first channel state information (CSI) for the first resource region based on the first RS; and
transmitting the first CSI to the base station,
wherein the information indicating usage patterns indicates a plurality of different usage patterns for the plurality of scheduling region maps, the first usage pattern includes information instructing to use one of the plurality of scheduling region maps according to a preset time interval, and the plurality of resource regions constituting the plurality of scheduling region maps are different resource regions,
wherein the first resource allocation information indicates a number of resource blocks (RBs) constituting each of the plurality of resource regions.

2. The operation method according to claim 1, further comprising:
receiving a downlink control information (DCI) including scheduling information generated based on the first CSI from the base station through a physical downlink control channel (PDCCH); and
receiving data from the base station through a physical downlink shared channel (PDSCH) indicated by the scheduling information among the plurality of resource regions.

3. The operation method according to claim 1, further comprising:
receiving from the base station information instructing to change the first usage pattern to a second usage pattern;
receiving second resource allocation information indicating a second resource region allocated to the terminal according to the second usage pattern;
receiving a second RS from the base station through the second resource region;
generating a second CSI for the second resource region based on the second RS; and
transmitting the second CSI to the base station.

4. The operation method according to claim 1, wherein the first resource allocation information indicates a number of symbols and a number of resource blocks (RBs) constituting each of the plurality of resource regions.

5. The operation method according to claim 1, wherein the information indicating the usage patterns is received through a radio resource control (RRC) message or a physical broadcast channel (PBCH).

6. An operation method of a base station in a mobile communication system, the operation method comprising:
transmitting information indicating usage patterns for a plurality of scheduling region maps, each of the plurality of scheduling region maps consisting of a plurality of resource regions;

transmitting information indicating a first usage pattern among the usage patterns;

transmitting to a terminal first resource allocation information indicating a first resource region allocated to the terminal among the plurality of resource regions constituting the plurality of scheduling region maps according to the first usage pattern;

transmitting a first reference signal (RS) to the terminal through the first resource region; and receiving from the terminal a first channel state information (CSI) for the first resource region generated based on the first RS, wherein the information indicating usage patterns indicates a plurality of different usage patterns for the plurality of scheduling region maps, the first usage pattern includes information instructing to use one of the plurality of scheduling region maps according to a preset time interval, and the plurality of resource regions constituting the plurality of scheduling region maps are different resource regions, wherein the first resource allocation information indicates a number of resource blocks (RBs) constituting each of the plurality of resource regions.

7. The operation method according to claim 6, further comprising:

transmitting a downlink control information (DCI) including scheduling information generated based on the first CSI to the terminal through a physical downlink control channel (PDCCH); and transmitting data to the terminal through a physical downlink shared channel (PDSCH) indicated by the scheduling information among the plurality of resource regions.

8. The operation method according to claim 6, further comprising:

transmitting information instructing to change the first usage pattern to a second usage pattern;

transmitting to the terminal second resource allocation information indicating a second resource region allocated to the terminal according to the second usage pattern;

transmitting a second RS to the terminal through the second resource region; and receiving from the terminal a second CSI for the second resource region generated based on the second RS.

9. The operation method according to claim 6, wherein the first resource allocation information indicates a number of symbols and a number of resource blocks (RBs) constituting each of the plurality of resource regions.

10. The operation method according to claim 6, wherein the information indicating the usage patterns is received through a radio resource control (RRC) message or a physical broadcast channel (PBCH).

\* \* \* \* \*